UNITED STATES PATENT OFFICE.

ROBERT HOCHSTETTER, OF CINCINNATI, OHIO.

INK.

No. 928,915.  Specification of Letters Patent.  Patented July 20, 1909.

Original application filed October 13, 1905, Serial No. 282,592. Divided and this application filed October 19, 1905. Serial No. 283,472.

*To all whom it may concern:*

Be it known that I, ROBERT HOCHSTETTER, a citizen of the United States, and a resident of Cincinnati, in the county of Hamilton, and State of Ohio, have invented a certain new and useful Improvement in Ink, of which the following is a full, clear, and exact description.

My improvement relates to inks to be used in an oscillating mimeograph, or machine of similar character.

The object of my invention is to produce an ink which will remain moist on the pad, while at the same time it shall have the quality of drying rapidly on the sheet, so that after each operation of the mimeograph, the printed sheets may fall one upon the other without danger of "smudging".

The difficulty with the inks at present in use is that when a quick drying ink is used, so that it dries rapidly on the paper, it dries with equal rapidity in the pad and waxed stencil, and clogs them, thus preventing the ready flow of ink through the pad and stencil. On the other hand, when a slow drying ink is used, although it will not clog the pad and waxed stencil, and will freely flow through them, it dries so slowly on the paper that the printed sheets can not be thrown immediately after each operation, one upon the other, because the ink being moist, will cause the sheets to "smudge".

Many inks have been tried with an effort to overcome the above difficulty. For example, mimeograph ink consisting of thin printer's ink mixed with vaseline has been used with an ordinary hand mimeograph, but this ink cannot be used on an oscillating mimeograph for the reason that it will not draw evenly and continuously through the pad by means of capillary attraction, as is necessary in such a machine, and will leave an oily outline to the letters on the paper. Again printer's ink has been mixed with an emulsion of glycerin and borax (borated glycerin), or other alkaline agents and glycerin. This ink will draw through the pad, but will dry slowly on the paper. My improved ink is especially adapted for use in an oscillating mimeograph, in which the ink is drawn into the pad and through the waxed stencil by means of capillary attraction.

My improved ink as claimed herein relates especially to such as are made from inorganic pigments, and carbon black pigments, and this is a divisional application embodying a species of the genus described in my application Serial Number 86,002, filed December 14th, 1901, for improvement in "Inks". In carrying out my invention, I grind the pigment in a mixture of glycerin and Turkey-red oil.

As a specific example of my improved ink, I give the following proportions:—Take $49\frac{1}{2}$ parts by weight of inorganic blue pigment made by 20 parts milori blue and 80 parts barium sulfate, and $42\frac{3}{4}$ parts by weight of glycerin. Grind this together until perfectly free from grit. To the above add $111\frac{1}{4}$ parts by weight of Turkey red oil and 54 parts by weight of glycerin. This produces the ink. The body of the ink, as described, can readily be changed by increasing the pigment or the vehicle as the case may require. As for example, for very warm climates, more pigment must be used; otherwise the resulting ink would be too thin. Milori blue is a ferric-ferro cyanid salt and of the same family as Prussian blue, Chinese blue, etc.

The use of the Turkey red oil increases the rapidity with which the ink will dry upon the paper, and appears simply to draw the ink right into the paper. With glycerin alone this would not be the case, its action being slower than the Turkey red oil. Turkey red oil is derived from castor oil, and its essential quality is that it will readily mix with glycerin and never settle from, or settle out, on standing. Other sulfonated oils have this characteristic, and can be used in the place of Turkey red oil. I therefore do not limit myself to the use of Turkey red oil.

I find that the ink thus produced not only flows easily and readily through the pad without clogging, but dries rapidly on the paper, thereby fulfilling the requirements of an ink to be used on oscillating mimeographs.

Having thus described my invention, what I desire to claim as new and to cover by Letters Patent is:—

1. An improved ink consisting of an inorganic pigment ground in a mixture of glycerin and a sulfonated oil, substantially as specified.

2. An improved ink consisting of an inorganic pigment ground in a mixture of glycerin and Turkey red oil, substantially as described.

3. An improved ink consisting of an inorganic pigment constructed on a base which will not enter into a chemical reaction with glycerin, ground in a mixture of glycerin and Turkey red oil, substantially as and for the purpose specified.

ROBERT HOCHSTETTER.

Witnesses:
CLARENCE E. MEHLHOPE,
JOSEPH R. ROHRER.